United States Patent
Choi

(10) Patent No.: US 10,241,737 B2
(45) Date of Patent: Mar. 26, 2019

(54) MOBILE TERMINAL AND METHOD FOR CONTROLLING THE SAME

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/710,632

(22) Filed: Sep. 20, 2017

(65) Prior Publication Data

US 2018/0081616 A1 Mar. 22, 2018

(30) Foreign Application Priority Data

Sep. 20, 2016 (KR) .......................... 10-2016-0119848

(51) Int. Cl.
| | |
|---|---|
| G06F 3/14 | (2006.01) |
| G06F 9/44 | (2018.01) |
| G06F 3/0484 | (2013.01) |
| H04M 1/725 | (2006.01) |
| G06F 9/451 | (2018.01) |
| G06F 3/0488 | (2013.01) |

(Continued)

(52) U.S. Cl.
CPC ............ G06F 3/1423 (2013.01); G06F 1/165 (2013.01); G06F 3/016 (2013.01); G06F 3/0484 (2013.01); G06F 3/0488 (2013.01); G06F 3/04847 (2013.01); G06F 9/451 (2018.02); H04M 1/7253 (2013.01); G06F 2203/04803 (2013.01); G09G 2370/16 (2013.01); H04W 88/02 (2013.01)

(58) Field of Classification Search
CPC .... G06F 3/0484; G06F 3/1423; G06F 9/4443; G06F 9/451; H04M 1/7253; H04W 88/02
USPC ............ 455/414.1, 575.1, 575.4, 566, 566.1; 345/1.2, 1.3, 173, 619, 592, 589, 522; 713/320; 715/268, 763, 773, 838
See application file for complete search history.

(56) References Cited

U.S. PATENT DOCUMENTS

| | | | |
|---|---|---|---|
| 2010/0060548 A1* | 3/2010 | Choi ..................... | G06F 3/0414 345/1.3 |
| 2010/0184485 A1* | 7/2010 | Kim ..................... | G06F 3/1423 455/566 |

(Continued)

FOREIGN PATENT DOCUMENTS

| | | |
|---|---|---|
| KR | 1020100041054 | 4/2010 |
| KR | 1020150123748 | 11/2015 |

OTHER PUBLICATIONS

PCT International Application No. PCT/KR2017/001429, Notification of Transmittal of the International Search Report and the Written Opinion of the International Searching Authority, or Declaration dated Jun. 16, 2017, 8 pages.

*Primary Examiner* — Tan H Trinh
(74) *Attorney, Agent, or Firm* — Lee, Hong, Degerman, Kang & Waimey PC

(57) ABSTRACT

A mobile terminal includes a memory configured to store at least one letter inputted by a user, a first display, a second display configured to display the at least one letter, and a controller configured to control the first display to display a wallpaper image of a lock screen. In this case, the controller is further configured to control the first display to display a letter image corresponding to an initial letter of the at least one letter on the wallpaper image.

8 Claims, 20 Drawing Sheets

(51) Int. Cl.
*G06F 1/16* (2006.01)
*G06F 3/01* (2006.01)
*H04W 88/02* (2009.01)

(56) References Cited

U.S. PATENT DOCUMENTS

| | | | | |
|---|---|---|---|---|
| 2013/0012264 A1* | 1/2013 | Mitsunaga | G01C 21/20 | 455/556.1 |
| 2013/0069962 A1* | 3/2013 | Nealer | H04M 1/72544 | 345/522 |
| 2013/0080964 A1* | 3/2013 | Shigeta | G06F 3/0488 | 715/773 |
| 2013/0249843 A1* | 9/2013 | Yano | G06F 3/0488 | 345/173 |
| 2013/0305189 A1* | 11/2013 | Kim | G06F 3/0482 | 715/838 |
| 2014/0184471 A1* | 7/2014 | Martynov | G06F 3/1423 | 345/1.2 |
| 2014/0189566 A1* | 7/2014 | Kim | G06F 3/013 | 715/773 |
| 2014/0218393 A1* | 8/2014 | Lee | G06F 3/0481 | 345/619 |
| 2014/0267064 A1* | 9/2014 | Lu | G06F 3/041 | 345/173 |
| 2015/0029206 A1* | 1/2015 | Bialota | G06T 11/00 | 345/589 |
| 2015/0058718 A1* | 2/2015 | Kim | G06F 17/242 | 715/268 |
| 2015/0205498 A1* | 7/2015 | Levi | G06F 3/04842 | 715/763 |
| 2015/0301578 A1* | 10/2015 | Seo | G06F 1/3206 | 713/320 |
| 2015/0334219 A1* | 11/2015 | Soundararajan | H04M 1/67 | 455/414.1 |
| 2016/0234777 A1* | 8/2016 | Soundararajan | G06Q 20/3224 | |
| 2016/0379603 A1* | 12/2016 | Zhu | H04L 51/24 | 345/592 |
| 2017/0010794 A1* | 1/2017 | Cho | G06F 9/451 | |
| 2017/0048305 A1* | 2/2017 | Liu | G06F 3/0481 | |
| 2017/0169585 A1* | 6/2017 | Chen | G06F 3/04817 | |
| 2017/0277361 A1* | 9/2017 | Schulze | G06F 9/451 | |
| 2017/0277498 A1* | 9/2017 | Wood, Jr. | G06F 3/1423 | |
| 2017/0286913 A1* | 10/2017 | Liu | G06Q 10/109 | |

* cited by examiner

FIG. 12
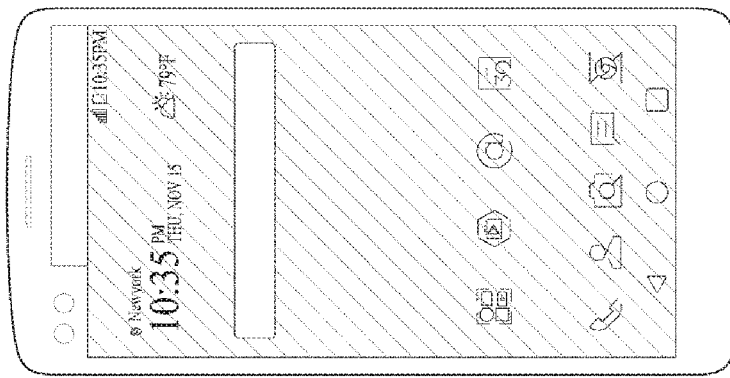
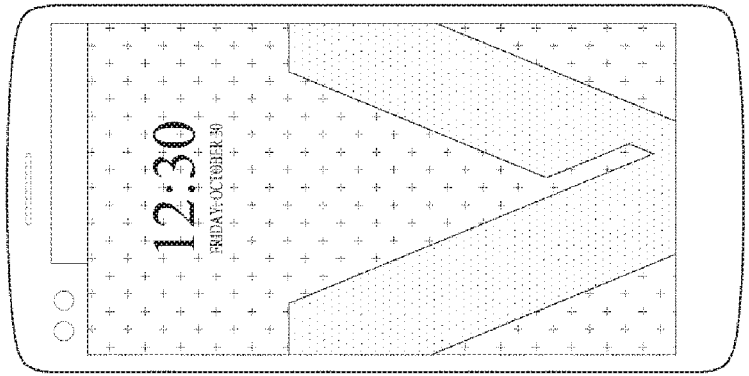

FIG. 17
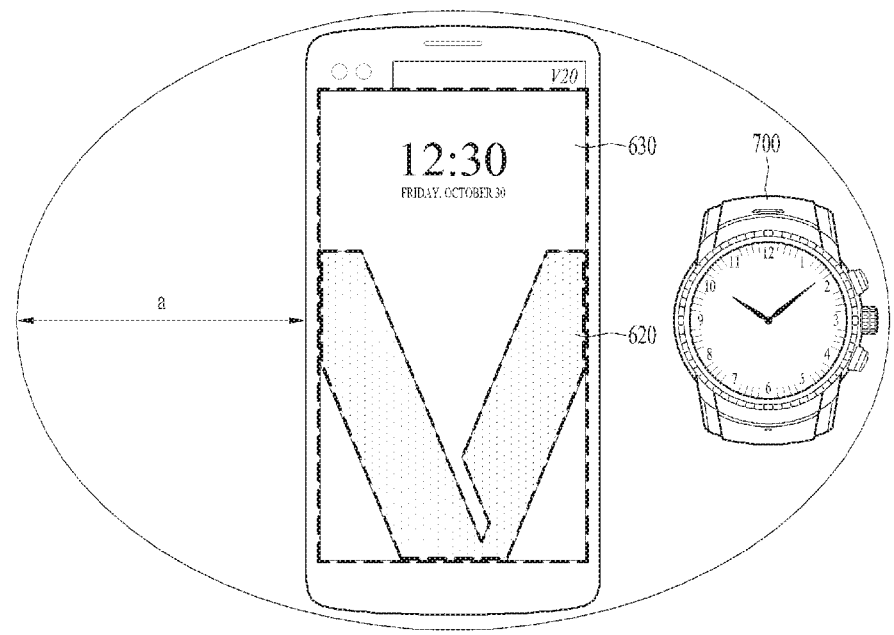
(a)
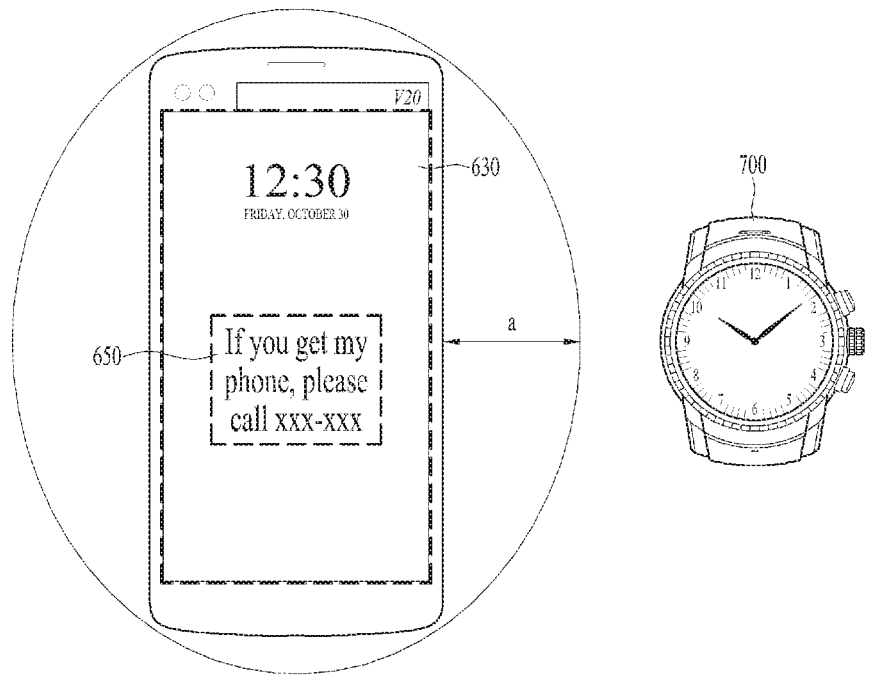
(b)

MOBILE TERMINAL AND METHOD FOR CONTROLLING THE SAME

CROSS-REFERENCE TO RELATED APPLICATIONS

This application claims the benefit of the Korean Patent Application No. 10-2016-0119848, filed on Sep. 20, 2016, which is hereby incorporated by reference as if fully set forth herein.

BACKGROUND OF THE INVENTION

Field of the Invention

The present invention relates to a mobile terminal and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, according to a mobile terminal of related art, the mobile terminal can include two displays independent from each other. In this case, the two displays are referred to as a main display and a second display, respectively.

The mobile terminal can display detail contents of an event occurred in the mobile terminal on the main display and display supportive contents (e.g., a phrase inputted by a user, etc.) on the second display. Although the contents on the event displayed on the main display can be displayed on the second display, since a size of the second display is smaller than a size of the main display, limited content can be displayed on the second display only.

And, according to the mobile terminal of the related art, an image of a lock screen of the mobile terminal should be directly set by a user. Since directly setting the image of the lock screen is cumbersome, users of the mobile terminal occasionally do not separately set an image displayed on the lock screen.

Hence, it is necessary to develop a mobile terminal of which a problem of the mobile terminal of the related art is resolved and a method of controlling therefor.

SUMMARY OF THE INVENTION

Accordingly, an object of the present invention is to address the above-noted and other problems.

One object of the present invention is to automatically generate an image to be displayed on a lock screen based on a word displayed on a second display and control a main display to display the generated image on the lock screen.

Another object of the present invention is to enable a user to easily recognize occurrence of an event in a manner of changing an image displayed on a lock screen according to occurrence of a preset event.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Accordingly, an object of the present invention is to address the above-noted and other problems.

To achieve these objects and other advantages and in accordance with the purpose of the invention, as embodied and broadly described herein, according to one embodiment, a mobile terminal includes a memory configured to store at least one letter inputted by a user, a first display, a second display configured to display the at least one letter, and a controller configured to control the first display to display a wallpaper image of a lock screen. In this case, the controller is further configured to control the first display to display a letter image corresponding to an initial letter of the at least one letter on the wallpaper image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

A mobile terminal and method for controlling the same according to the present invention provide the following effects and/or features.

According to at least one embodiment of the present invention, since a wallpaper image displayed on a lock screen is automatically changed based on a word inputted by a user, it is able to provide convenience to the user.

According to at least one embodiment of the present invention, since an image displayed on a lock screen is changed according to occurrence of a preset event, it is able to make a user easily recognize the occurrence of an event.

According to at least one embodiment of the present invention, it is able to make a user easily execute a specific function (e.g., deleting, sharing with an external device or an external server) in response to at least one image among a plurality of images belonging to a specific group.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 12 is a diagram for explaining a different example for a method of changing a phone theme of a mobile terminal according to a change of a wallpaper image of a lock screen in a mobile terminal according to one embodiment of the present invention.

FIG. 17 is a diagram for explaining an example for a method of changing a lock screen image which is displayed according to whether or not communication connection is established with a preset external device in a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
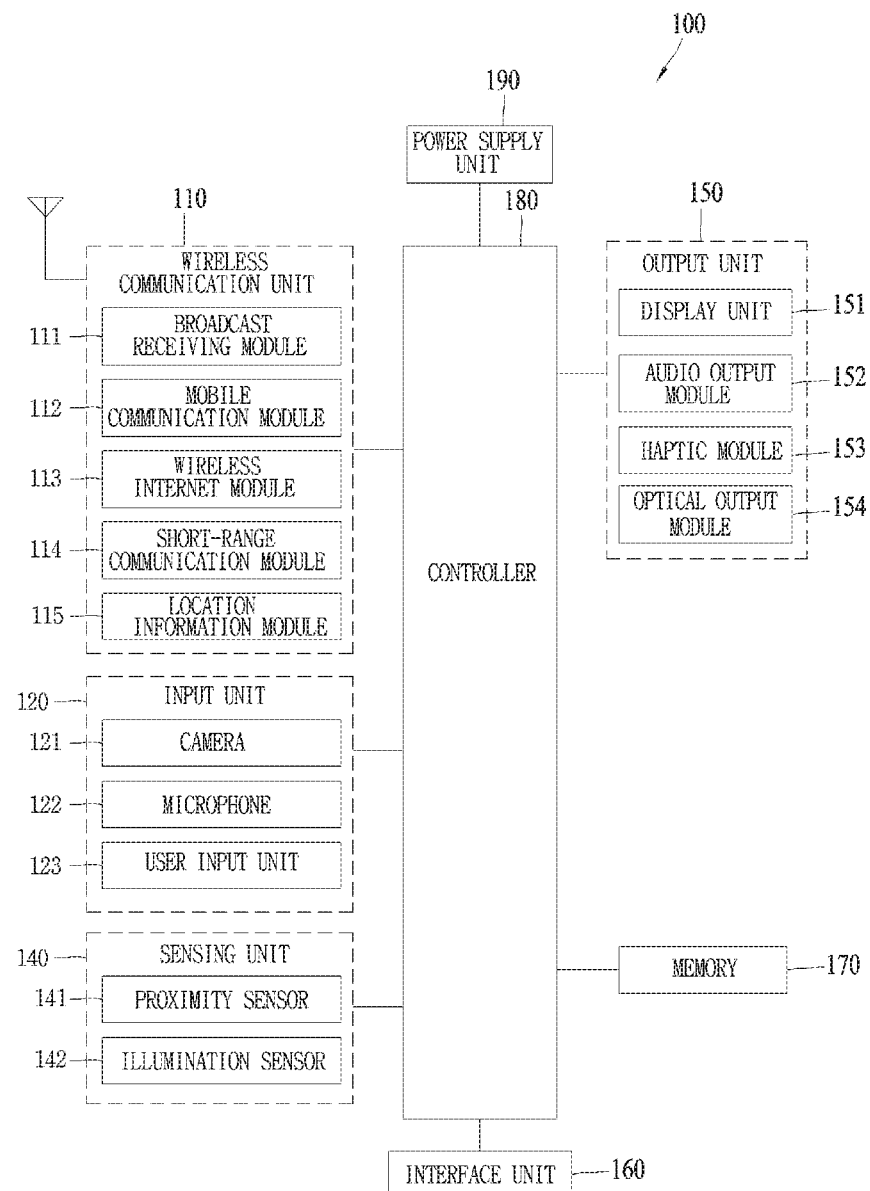
FIG. 1A is a block diagram of a mobile terminal in accordance with the present disclosure.
Figure 1B:
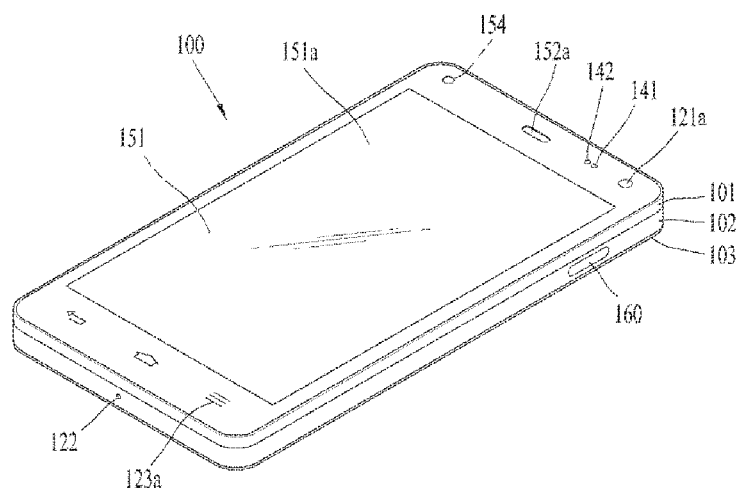
FIGS. 1B and 1C are conceptual views of one example of the mobile terminal, viewed from different directions.
Figure 1C:
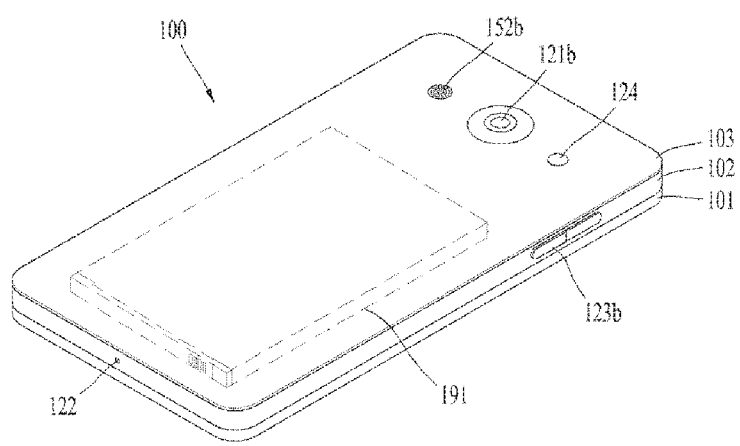

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed by the mobile terminal using a flexible display. This is described in detail with reference to the accompanying drawings as follows.

Figure 2:
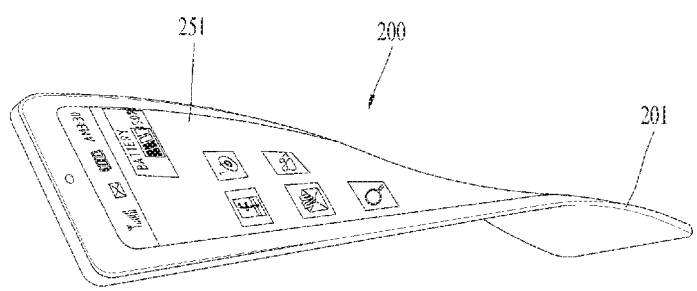
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
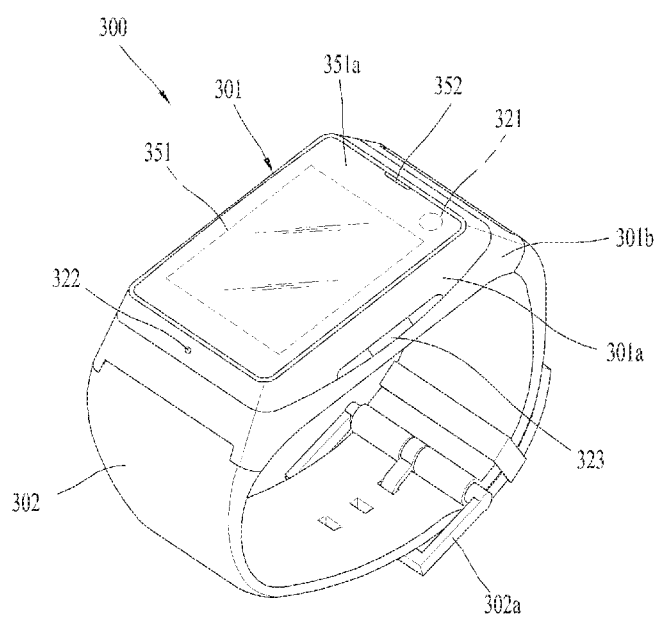
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
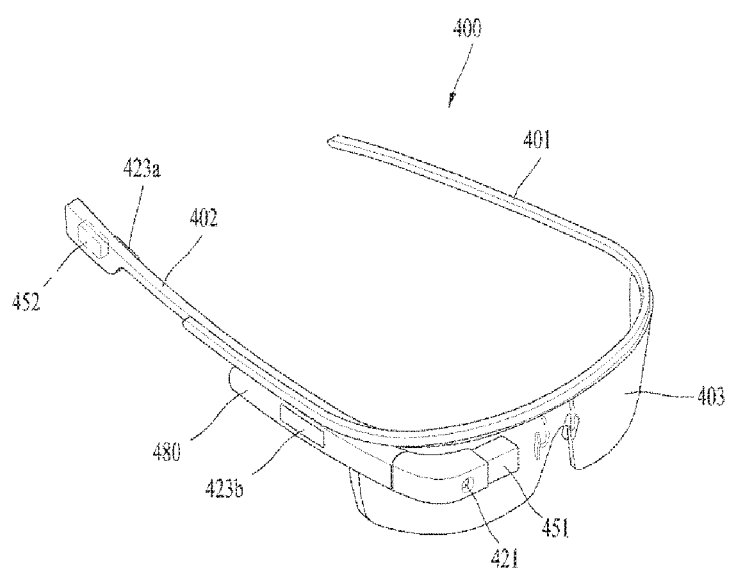
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, embodiments of the present invention are explained with an example of a mobile terminal shown in FIG. 1a as a mobile terminal. Yet, it is apparent that a mobile terminal according to one embodiment of the present invention can be implemented by a mobile terminal 200/300/400 shown in FIGS. 2 to 4.

Figure 5:
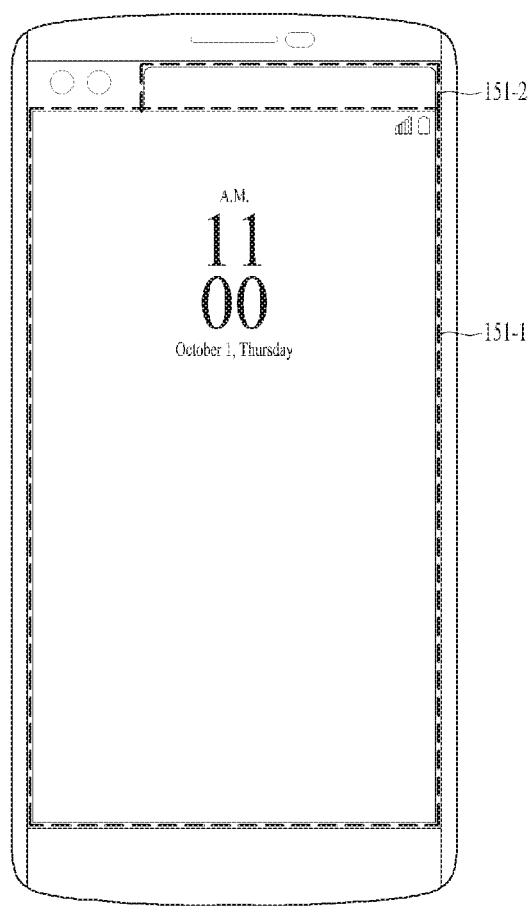
FIG. 5 is a diagram for explaining a mobile terminal of related art related to the present invention.

FIG. 5 is a diagram for explaining a mobile terminal of related art related to the present invention.

Referring to FIG. 5, a mobile terminal of related art can include two displays 151-1/151-2 independent from each other. In this case, the two displays 151-1/151-2 are referred to as a main display 151-1 and a second display, respectively.

According to the related art, the mobile terminal can display detail contents of an event occurred on the mobile terminal on the main display 151-1. And, the main display 151-1 can display an image of a lock screen.

Meanwhile, as shown in FIG. 5, the second display 151-2 can display a phrase inputted by a user, by which the present invention may be non-limited. A screen related to an event can be displayed on the second display 151-2. Yet, since a size of the second display 151-2 is smaller than a size of the main display 151-1, limited content can be displayed on the second display 151-2 only.

Meanwhile, since the second display 151-2 corresponds to a display independent from the main display 151-1, although power of the main display 151-1 is turned off, power of the second display 151-2 may be turned on. Hence, at least one word inputted on the second display 151-2 by a user can be continuously displayed.

Meanwhile, although it is not the related art, according to one embodiment of the present invention, a user can designate a specific color to the second display 151-2. For example, if the user designates a red color to the second display 151-2, the red color can be continuously outputted on the second display 151-2.

In the following, assume that the mobile terminal includes the main display 151-1 and the second display 151-2.

Method of Automatically Setting Image Displayed on Lock Screen

Figure 6:
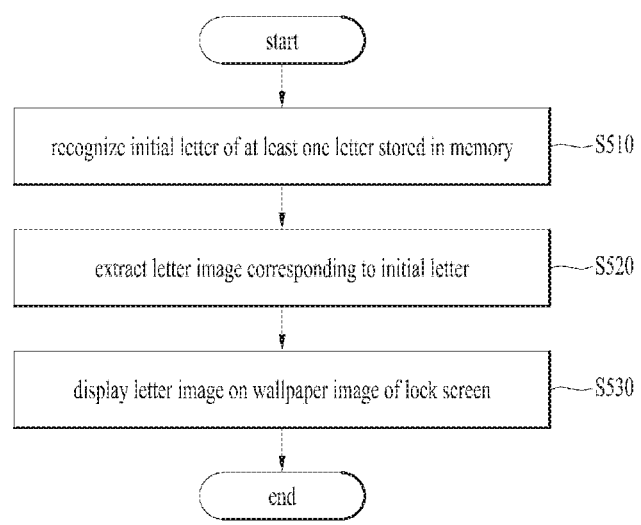
FIG. 6 is a flowchart for explaining an example of a method of automatically setting an image displayed on a lock screen in a mobile terminal according to one embodiment of the present invention.

FIG. 6 is a flowchart for explaining an example of a method of automatically setting an image displayed on a lock screen in a mobile terminal according to one embodiment of the present invention.

According to one embodiment of the present invention, at least one letter inputted by a user can be stored in a memory 170.

Specifically, a user can input at least one letter to be displayed on the second display 151-2 via a setting menu. A controller 180 can store the at least one letter inputted by the user in the memory 170.

In this case, the at least one letter may correspond to 'a, b, c, and d' in case of English or may correspond to 'ㄱ, ㄴ, ㄷ, ㅏ, ㅣ, and ㅣ' in case of Korean.

The at least one letter inputted by the user can be displayed on the second display 151-2 all the time. Specifically, although power of the main display 151-1 is turned off, the second display 151-2 can display the at least one letter.

Meanwhile, the controller 180 can recognize an initial letter of the at least one letter stored in the memory 170 [S510]. In this case, the initial letter indicates a first letter of the at least one letter.

For example, if the at least one letter inputted by the user corresponds to 'v20', the initial letter of the at least one letter may correspond to 'v'. Yet, in the country reading letters from the right to the left, the initial letter may correspond to '0'. In the following, for clarity, assume that a very left letter among the at least one letter corresponds to the initial letter.

A method of recognizing the initial letter is described in the following.

According to one embodiment, when a user inputs at least one letter, the controller 180 detects a letter firstly inputted by the user and can recognize the detected letter as an initial letter of the at least one letter.

According to a different embodiment, the memory 170 may store an initial letter recognition algorithm in advance. The controller 180 can recognize the initial letter using the initial letter recognition algorithm. In this case, the algorithm can be stored in the memory 170 according to each country. This because a method of reading letters (e.g., reading from the right to the left or reading from the left to the right) may vary according to a country.

Meanwhile, if the controller 180 recognizes the initial letter in the step S510, the controller can extract a letter image corresponding to the initial letter [S520].

As an example, a plurality of letter images can be stored in the memory 170. The controller 180 can extract a letter image corresponding to the recognized initial letter among a plurality of the letter images from the memory 170. For example, if the controller 180 recognizes the initial letter as 'v', the controller can extract an image including a 'v' shape corresponding to the initial letter 'v' from the memory 170.

According to an embodiment, if the initial letter is recognized in the step S510, the controller 180 may generate an image corresponding to the recognized initial letter. For example, if the controller 180 recognizes the initial letter as 'v', the controller may newly generate an image without extracting an image corresponding to the 'v' from the memory 170. In this case, the controller 180 can generate an image corresponding to a color of a wallpaper image of a lock screen.

Meanwhile, the controller 180 can control the main display 151-1 to display the image corresponding to the initial letter on the wallpaper image of the lock screen [S530]. In this case, if a password is set to the mobile terminal 100, the lock screen may correspond to a screen which is displayed before the password is unlocked. Or, the lock screen may correspond to a screen displayed on the main display 151-1 when the power of the main display 151-1 is tuned off and on. And, the wallpaper image 630 of the lock screen may correspond to an image which is displayed at the time of displaying the lock screen.

As an example, when the lock screen is displayed, the controller 180 can display an image corresponding to the initial letter in a manner of overlaying the wallpaper image of the lock screen with the image corresponding to the initial letter.

Meanwhile, according to an embodiment, the controller 180 can generate a new image using an image corresponding to the initial letter and the wallpaper image of the lock screen. And, the controller 180 can display the generated image as an image of the lock screen. In this case, the generated image may correspond to an image including the image corresponding to the initial letter. Consequently, a user recognizes it as the letter image is displayed on the wallpaper image of the lock screen.

According to an embodiment, if the initial letter is detected in the step S510, the controller 180 can display the detected initial letter on the wallpaper image. In particular, the controller 180 can display the detected initial letter on the wallpaper image by changing a size of the initial letter itself instead of displaying a letter image corresponding to the detected initial letter on the wallpaper image. In this case, a color of the displayed initial letter may correspond to a color corresponding to a color of the wallpaper image. Consequently, a user recognizes it as the letter image is displayed on the wallpaper image of the lock screen.

According to the present embodiment, the controller 180 can automatically set an image of a lock screen.

Method of Inputting at Least One Letter to be Displayed on Second Display

Figure 7:
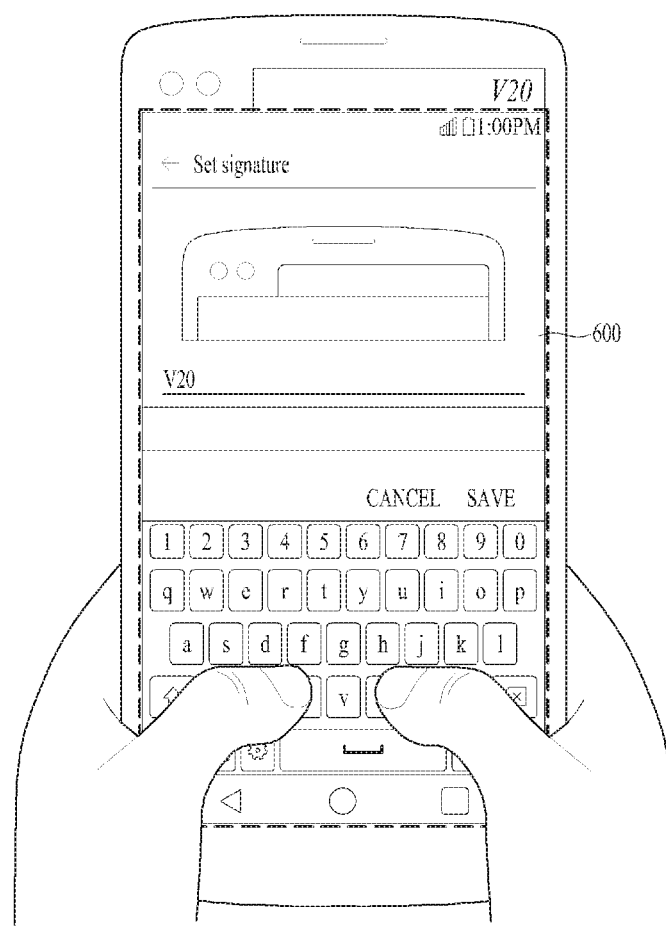
FIG. 7 is a diagram for explaining an example for a method of inputting at least one letter to be displayed on a second display in a mobile terminal according to one embodiment of the present invention.

FIG. 7 is a diagram for explaining an example for a method of inputting at least one letter to be displayed on a second display in a mobile terminal according to one embodiment of the present invention.

According to one embodiment of the present invention, a user can input at least one letter to be displayed on the second display 151-2 using a setting menu.

Specifically, referring to FIG. 7, if a command for selecting a menu for setting at least one letter is detected, the controller 180 can control the main display 151-1 to display an input window 600 to which the at least one letter is inputted.

The controller 180 can detect an input of at least one letter using the input window 600. The controller 180 can store at least one letter selected by the input in the memory 170.

The controller 180 can control the second display 151-2 to display the inputted at least one letter on the second display 151-2.

For example, if a command for inputting 'v20' is detected using the input window 600, the controller 180 can store the 'v20' in the memory 170. Subsequently, the controller 180 can control the second display 151-2 to display the inputted 'v20' on the second display 151-2.

Method of Displaying Lock Screen

According to one embodiment of the present invention, when a lock screen is displayed, the controller 180 can control the second display 151-2 to display at least one letter inputted by a user on the second display 151-2. Subsequently, the controller 180 can control the main display 151-1 to display a letter image corresponding to an initial letter of the at least one letter on a wallpaper image. Regarding this, it shall be explained in more detail with reference to FIGS. 8 and 9.

Figure 8:
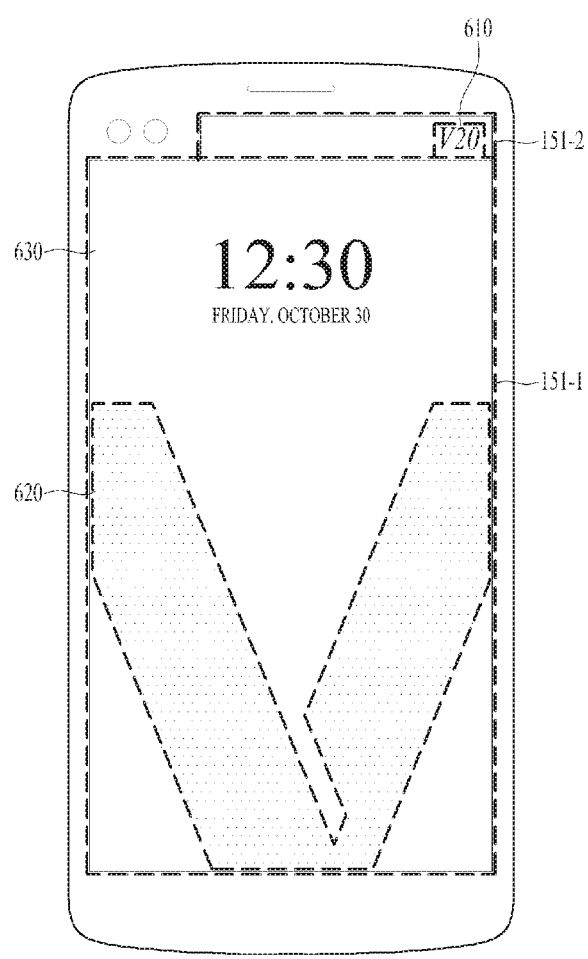
FIG. 8 is a diagram for explaining an example for a method of displaying a lock screen in a mobile terminal according to one embodiment of the present invention.

FIG. 8 is a diagram for explaining an example for a method of displaying a lock screen in a mobile terminal according to one embodiment of the present invention. In relation to FIG. 8, assume that at least one letter inputted by a user corresponds to 'v20'.

Referring to FIG. 8, when a lock screen is displayed, the controller 180 can recognize at least one letter 610 stored in the memory 170. For example, if at least one letter stored in the memory 170 corresponds to 'v20', the controller can recognize the 'v20' as the at least one letter 610.

The controller 180 can control the second display 151-2 to display the at least one letter 610 on the second display 151-2.

Meanwhile, the controller 180 can recognize a letter corresponding to an initial letter of the at least one letter. For example, since the at least one letter corresponds to 'v20', the controller 180 can recognize 'v' as the initial letter.

The controller 180 can control the main display 151-1 to display a letter image 620 corresponding to the recognized initial letter on a wallpaper image 630 of a lock screen.

For example, if the at least one letter corresponds to 'v20', the controller 180 can control the main display 151-1 to display the letter image 620 corresponding to the initial letter 'v' on the wallpaper image 630.

Figure 9:
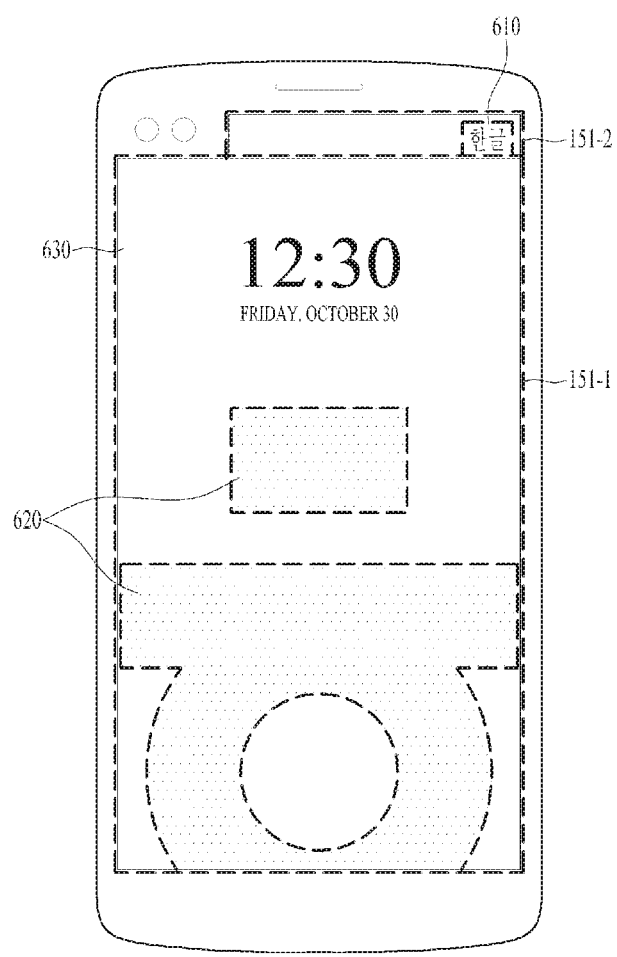
FIG. 9 is a diagram for explaining a different example for a method of displaying a lock screen in a mobile terminal according to one embodiment of the present invention.

FIG. 9 is a diagram for explaining a different example for a method of displaying a lock screen in a mobile terminal according to one embodiment of the present invention. In relation to FIG. 9, assume that at least one letter inputted by a user corresponds to such a Korean word as '한글'.

Referring to FIG. 9, when a lock screen is displayed, the controller 180 can recognize at least one letter 610 stored in the memory 170. For example, if at least one letter stored in the memory 170 corresponds to '한글', the controller can recognize the '한글'.

The controller 180 can control the second display 151-2 to display the at least one letter 610 on the second display 151-2.

Meanwhile, the controller 180 can recognize a letter corresponding to an initial letter of the at least one letter. For example, since the at least one letter corresponds to '한글', the controller 180 can recognize 'ㅎ' as the initial letter.

The controller 180 can control the main display 151-1 to display a letter image 620 corresponding to the recognized initial letter on a wallpaper image 630 of a lock screen.

For example, if the at least one letter corresponds to '한글', the controller 180 can control the main display 151-1 to display the letter image 620 corresponding to the initial letter 'ㅎ' on the wallpaper image 630.

According to the embodiments mentioned earlier in FIGS. 8 and 9, since a wallpaper image displayed on a lock screen is automatically changed based on a word inputted by a user, it is able to provide a user with convenience.

Method of Setting Colors of Wallpaper Image and Letter Image

According to one embodiment of the present invention, the controller 180 can recognize a color of a wallpaper image of a lock screen. And, the controller 180 can configure a color of a letter image 620 displayed on the wallpaper image by a color corresponding to the recognized color of the wallpaper image 630. Regarding this, it shall be explained in more detail with reference to FIG. 10 in the following.

Figure 10:
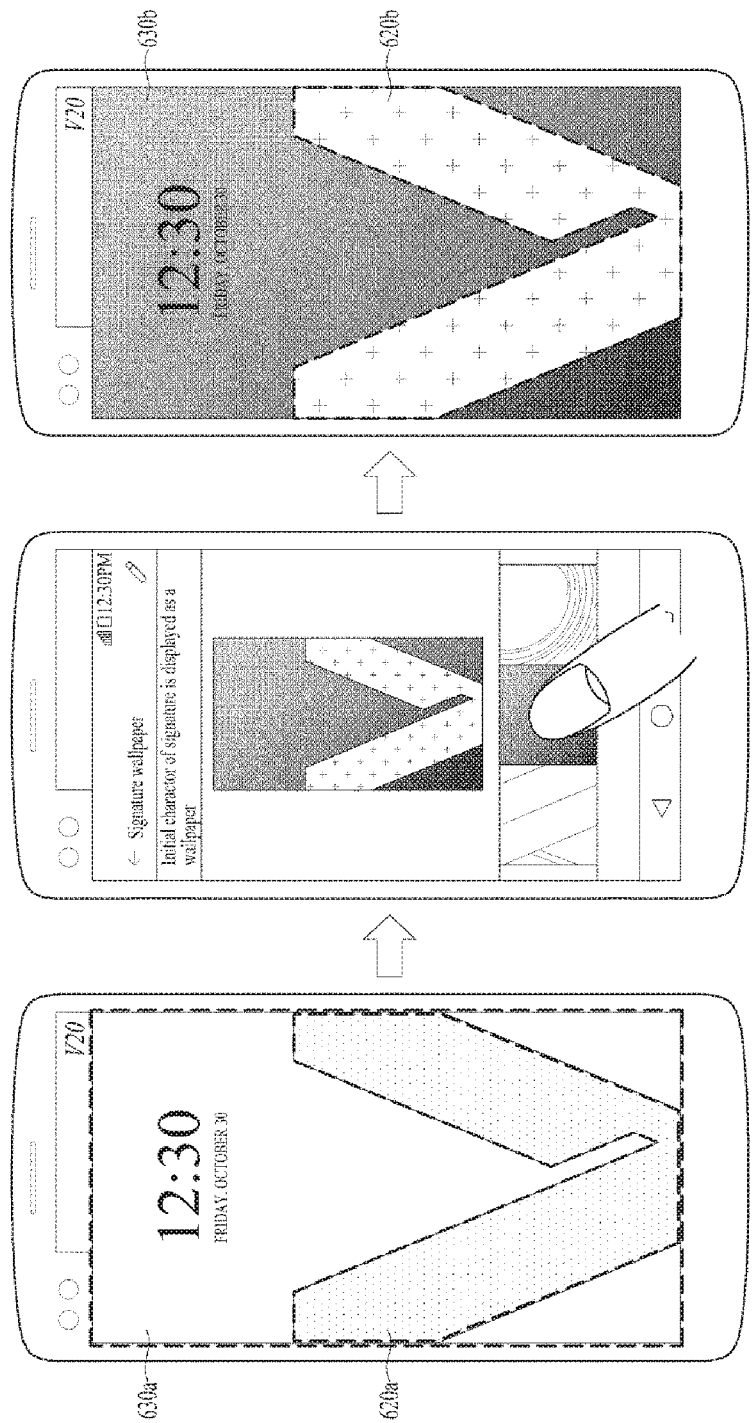
FIG. 10 is a diagram for explaining an example for a method of setting a color of a letter image in a mobile terminal according to one embodiment of the present invention.

FIG. 10 is a diagram for explaining an example for a method of setting a color of a letter image in a mobile terminal according to one embodiment of the present invention. In relation to FIG. 10, assume that at least one letter inputted by a user corresponds to 'v20'.

According to one embodiment of the present invention, the controller 180 can recognize an initial letter 'v' of the at least one letter 'v20' stored in the memory 170. The controller 180 can control a display to display an image 620a corresponding to the initial letter 'v' on a wallpaper image 630a of a lock screen. In this case, the wallpaper image 630a of the lock screen may correspond to a wallpaper image set to the lock screen by default.

Meanwhile, the controller 180 recognizes a color of the wallpaper image 630a and may be able to configure a color corresponding to the recognized color as a color of the letter image 620a.

As an example, referring to FIG. 10 (a), if the color of the wallpaper image 630a corresponds to a first color which is a solid color, the controller 180 can configure a second color corresponding to the first color as a color of the letter image 'v' 620a.

Meanwhile, according to an embodiment, if the color of the wallpaper image 630a has a plurality of colors, the controller 180 can recognize a first color corresponding to a main color of the wallpaper image 630a among a plurality of the colors. Subsequently, the controller 180 can configure a second color corresponding to the recognized first color as a color of the letter image. In this case, although the first color and the second color correspond to colors different from each other, the colors may correspond to colors of similar feeling, by which the present invention may be non-limited. The second color and the first color may correspond to complementary colors.

Meanwhile, the controller 180 may change at least one of the color of the wallpaper image of the lock screen and the color of the letter image according to a specific input of a user. And, the controller 180 may be able to change the wallpaper image 630a itself of the lock screen according to the specific input.

Specifically, referring to FIG. 10 (b), when the letter image 620 is displayed on the wallpaper image 610 of the lock screen, the controller 180 can detect a command for changing at least one of the wallpaper image 630a of the lock screen and the letter image 620a. The controller 180 can control a display to display a specific screen for changing at least one of a color of the wallpaper image 630a of the lock screen and a color of the letter image 620a according to the command.

A user can change at least one selected from the group consisting of the color of the wallpaper image of the lock screen, the color of the letter image, and the wallpaper of the lock screen using the displayed specific screen.

Referring to FIG. 10 (c), if a user changes the wallpaper image 630a of the lock screen using the specific screen, the controller 180 can control the main display 151-1 to display the changed wallpaper image 630b as a wallpaper image of the lock screen. The controller 180 can recognize a third color of the changed wallpaper image. The controller 180 can change the color of the letter image 620b with a fourth color corresponding to the third color.

In this case, although the third color and the fourth color correspond to colors different from each other, the colors may correspond to colors of similar feeling, by which the present invention may be non-limited. The third color and the fourth color may correspond to complementary colors.

Consequently, if a user changes the color of the wallpaper image 630b or changes the wallpaper image 630b itself, the color of the letter image 620b can be automatically changed.

Method of Changing Phone Theme of Mobile Terminal According to Change of Wallpaper Image of Lock Screen According to one embodiment of the present invention, if a wallpaper image of a lock screen is changed according to a specific input, the controller 180 can change a phone theme of a mobile terminal according to the change of the wallpaper image. Regarding this, it shall be explained in more detail with reference to FIGS. 11 and 12 in the following.

Figure 11:
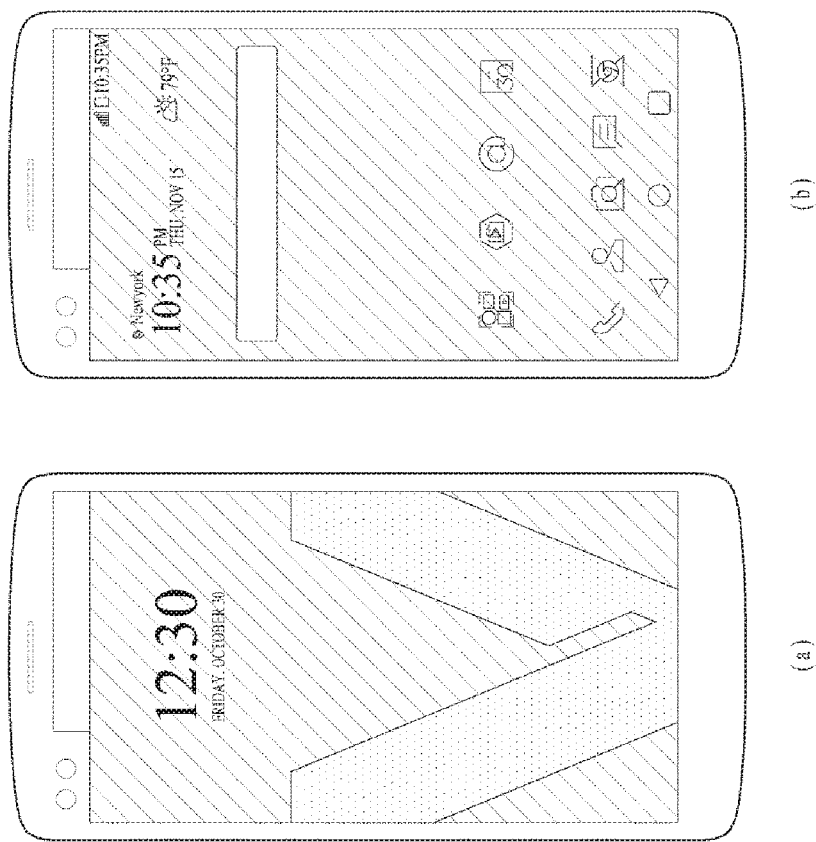
FIG. 11 is a diagram for explaining an example for a method of changing a phone theme of a mobile terminal according to a change of a wallpaper image of a lock screen in a mobile terminal according to one embodiment of the present invention.

FIG. 11 is a diagram for explaining an example for a method of changing a phone theme of a mobile terminal according to a change of a wallpaper image of a lock screen in a mobile terminal according to one embodiment of the present invention.

According to the present invention, the controller 180 can change a color of a wallpaper image of a lock screen or the wallpaper image itself of the lock screen according to a specific input. And, the controller 180 can change a phone theme of the mobile terminal according to the change of the color of the wallpaper image of the lock screen or the change of the wallpaper image itself.

In this case, the phone theme of the mobile terminal corresponds to a concept including overall color of a user interface of the mobile terminal, a color of a menu, a wallpaper image, a shape of a folder, a color of a folder, and the like. In particular, if a user changes a wallpaper image of a lock screen, a menu color of the mobile terminal, a wallpaper image of a home screen and the like can be changed at the same time.

Specifically, referring to FIG. 11 (a), if the controller 180 recognizes that the color of the wallpaper image of the lock screen is changed to a first color according to the specific input, as shown in FIG. 11 (b), the controller can change a color of the wallpaper image of the home screen to make the wallpaper image of the home screen have a second color corresponding to the first color. In this case, colors of icons included in the home screen, colors of folders and the like can be changed to a color corresponding to the second color.

Meanwhile, according to an embodiment, if the color of the wallpaper image of the lock screen is changed to the first color according to the specific input, the controller 180 can change overall color of an execution screen of an application and a color of a menu screen to the second color.

In this case, although the first color and the second color correspond to colors different from each other, the colors may correspond to colors of similar feeling, by which the present invention may be non-limited. The first color and the second color may correspond to complementary colors. Regarding this, it shall be explained in more detail with reference to FIG. 12 in the following.

FIG. 12 is a diagram for explaining a different example for a method of changing a phone theme of a mobile terminal according to a change of a wallpaper image of a lock screen in a mobile terminal according to one embodiment of the present invention.

According to the present invention, the controller 180 can change a color of a wallpaper image of a lock screen or the wallpaper image itself of the lock screen according to a specific input. And, the controller 180 can change a phone theme of the mobile terminal according to the change of the color of the wallpaper image of the lock screen or the change of the wallpaper image itself.

In this case, the phone theme of the mobile terminal corresponds to a concept including overall color of a user interface of the mobile terminal, a color of a menu, a wallpaper image, a shape of a folder, a color of a folder, and the like. In particular, if a user changes a wallpaper image of a lock screen, a menu color of the mobile terminal, a wallpaper image of a home screen and the like can be changed at the same time.

Specifically, referring to FIG. 12 (*a*), if the controller 180 recognizes that the color of the wallpaper image of the lock screen is changed to a first color according to the specific input, as shown in FIG. 12 (*b*), the controller can change a color of the wallpaper image of the home screen to make the wallpaper image of the home screen have a second color corresponding to a complementary color of the first color. In this case, colors of icons included in the home screen, colors of folders and the like can be changed to a color corresponding to the second color, by which the present invention may be non-limited. The second color may correspond to a color deeper than the first color in depth of color.

According to the present embodiment, a user is able to perceive that a screen is switched to the home screen from the lock screen.

Meanwhile, according to an embodiment, if the color of the wallpaper image of the lock screen is changed to the first color according to the specific input, the controller 180 can change overall color of an execution screen of an application and a color of a menu screen to the second color.

Meanwhile, according to an embodiment, when the home screen is displayed, the controller 180 can control the main display 151-1 to display the home screen more brightly compared to a case of displaying the lock screen. Hence, a user can more easily recognize that a screen is switched to the home screen from the lock screen.

Method of Changing Lock Screen Image According to Preset Event

According to one embodiment of the present invention, the controller 180 can change at least one selected from the group consisting of a wallpaper image of a lock screen, a letter image displayed on the wallpaper image, and a color of the letter image according to a preset event. Regarding this, it shall be explained in more detail with reference to FIGS. 13 to 16 in the following.

Figure 13:
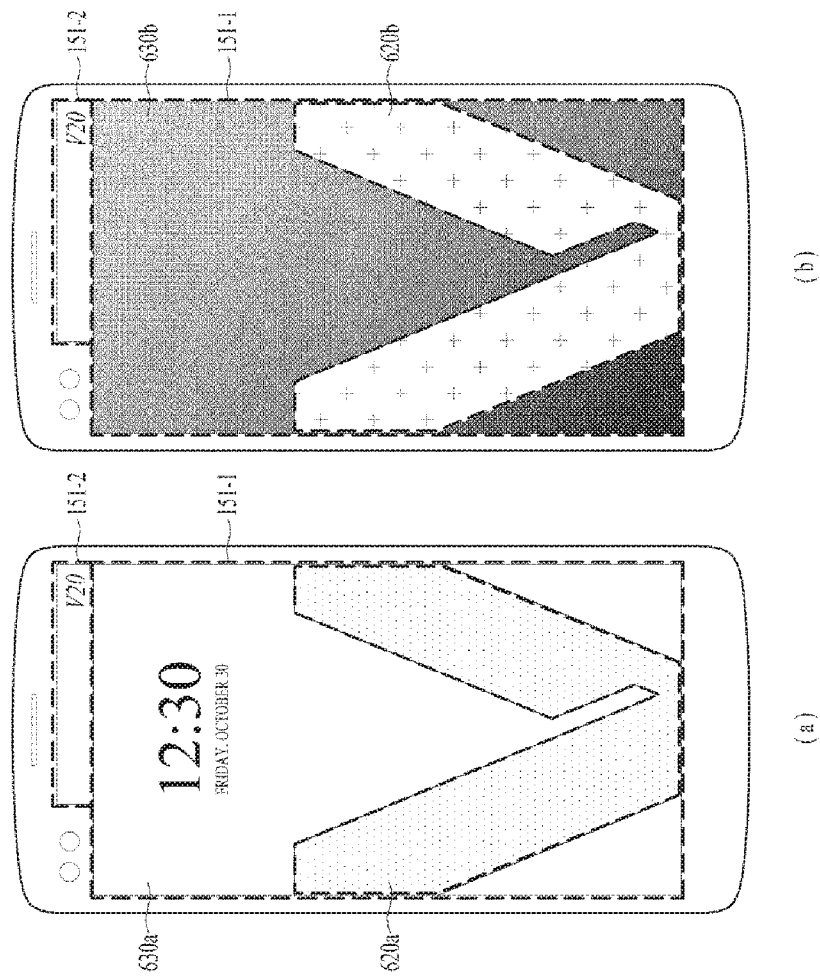
FIG. 13 is a diagram for explaining an example for a method of changing a lock screen image according to a preset event in a mobile terminal according to one embodiment of the present invention.

FIG. 13 is a diagram for explaining an example for a method of changing a lock screen image according to a preset event in a mobile terminal according to one embodiment of the present invention.

Referring to FIG. 13 (*a*), the controller 180 can control the second display 151-2 to display at least one letter inputted by a user on the second display 151-2. And, the controller 180 can recognize an initial letter of the at least one letter. When the lock screen is displayed, the controller 180 can control the main display 151-1 to display a letter image 620*a* corresponding to the recognized initial letter on the wallpaper image 630*a* of the lock screen. In this case, the letter image 620*a* may have a color corresponding to the wallpaper image.

Meanwhile, the controller 180 can change at least one selected from the group consisting of the letter image 620*a*, the wallpaper image 630*a*, and the color of the letter image 620*a* according to a preset event. In this case, the preset event includes a phone call received from a specific contact, a message received from the specific contact, unanswered call from the specific contact.

As an example, referring to FIG. 13 (*b*), if a phone call is received from the specific contact, a message is received from the specific contact, or unanswered call occurs, the controller 180 can change a color of the wallpaper image 630*b* with a first color set to the specific contact. And, the controller 180 can change a color of the letter image 620*b* with a second color corresponding to the changed first color. In this case, although the first color and the second color correspond to colors different from each other, the colors may correspond to colors of similar feeling, by which the present invention may be non-limited. The first color and the second color may correspond to complementary colors.

As a different example, if a phone call is received from a specific contact (or, if a message is received from the specific contact or unanswered call occurs), the controller 180 can change a color of the letter image 620*b* only with the first color set to the specific contact.

Meanwhile, the controller 180 can change at least one selected from the group consisting of the letter image 620*a*, the wallpaper image 630*a*, and the color of the letter image 620*a* according to a type of the preset event.

For example, if a phone call is received from the specific contact, the controller 180 changes the wallpaper image 630*a* with a first color. If a message is received from the specific contact, the controller changes the wallpaper image 630*a* with a second color. If unanswered call occurs from the specific contact, the controller can change the wallpaper image 630*a* with a third color. In this case, the first, the second and the third color may correspond to colors different from each other. And, the controller 180 can change the color of the letter image 620*b* to make the color correspond to the first color, the second color, or the third color.

According to the present embodiment, a user can easily perceive whether or not an event occurs by checking a wallpaper image of a lock screen.

Figure 14:
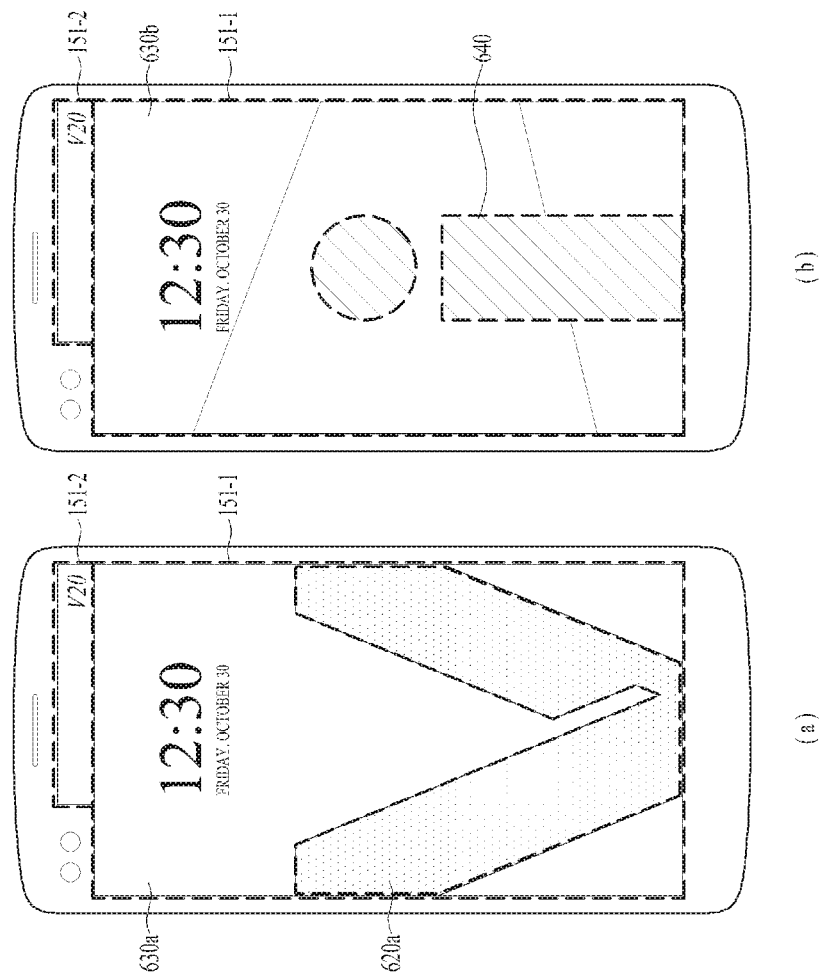
FIG. 14 is a diagram for explaining a different example for a method of changing a lock screen image according to a preset event in a mobile terminal according to one embodiment of the present invention.

FIG. 14 is a diagram for explaining a different example for a method of changing a lock screen image according to a preset event in a mobile terminal according to one embodiment of the present invention.

Referring to FIG. 14 (*a*), the controller 180 can control the second display 151-2 to display at least one letter inputted by a user on the second display 151-2. And, the controller 180 can recognize an initial letter of the at least one letter. When the lock screen is displayed, the controller 180 can control the main display 151-1 to display a first letter image 620a corresponding to the recognized initial letter on the wallpaper image 630a of the lock screen. In this case, the first letter image 620a may have a color corresponding to the wallpaper image.

Meanwhile, the controller 180 can change at least one selected from the group consisting of the first letter image 620a, the wallpaper image 630a, and the color of the first letter image 620a according to a preset event. In this case, the preset event includes a phone call received from a specific contact, a message received from the specific contact, unanswered call from the specific contact.

Specifically, referring to FIG. 14 (b), if a phone call is received from the specific contact (or, a message is received from the specific contact, or unanswered call occurs), the controller 180 can change a displayed letter image with a second letter image 630b corresponding to the specific contact. In this case, the second letter image 630b may correspond to an image corresponding to an initial letter of a name stored in the specific contact.

For example, if a phone call is received from 'isabel' stored in the specific contact, the controller 180 can recognize an initial letter 'i' of the 'isabel' stored in the specific contact. And, as shown in FIG. 14 (b), the controller 180 can control the main display 151-1 to display a letter image 640 of 'i' shape corresponding to the recognized 'i' on the wallpaper image 630b of the lock screen.

In this case, the wallpaper image 630b of the lock screen can be changed as well. If the wallpaper image 630b of the lock screen is changed, the controller 180 can determine a color of the second letter image 640 based on a color of the changed wallpaper image 630b. Consequently, the color of the second letter image 640 can be determined according to the color of the wallpaper image 630b.

According to the present embodiment, a user is able to easily perceive whether or not an event occurs by checking a wallpaper image of a lock screen.

Figure 15:
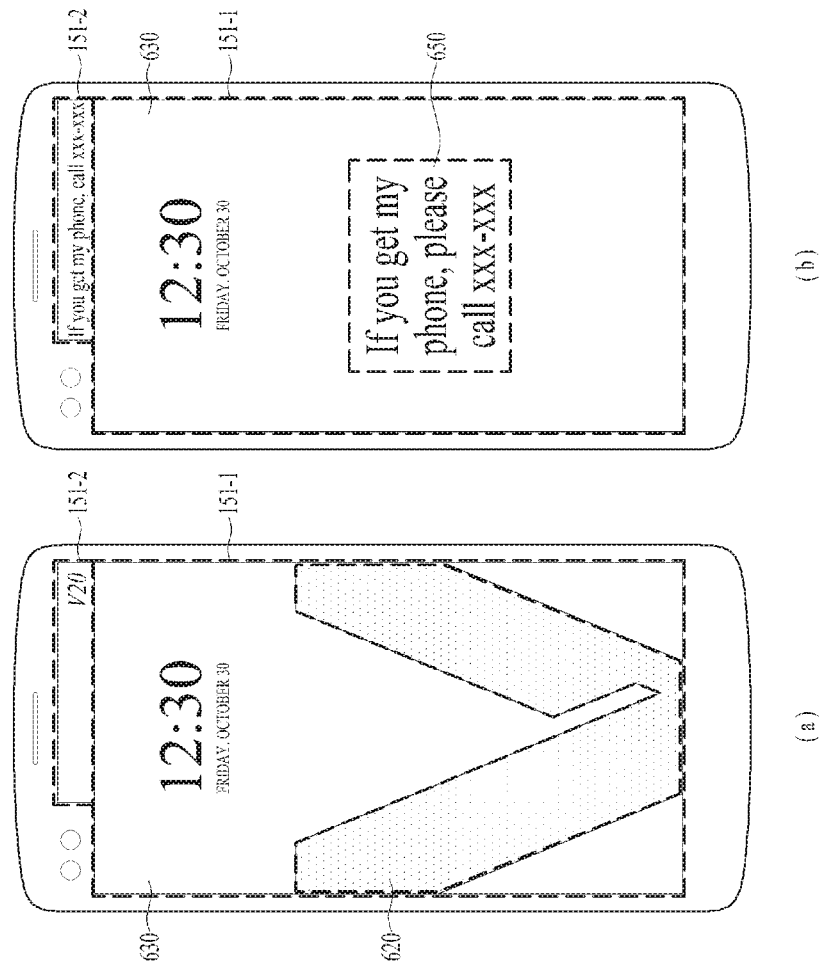
FIG. 15 is a diagram for explaining a further different example for a method of changing a lock screen image according to a preset event in a mobile terminal according to one embodiment of the present invention.

FIG. 15 is a diagram for explaining a further different example for a method of changing a lock screen image according to a preset event in a mobile terminal according to one embodiment of the present invention.

According to one embodiment of the present invention, a mobile terminal 100 can include a preset external device or a wireless communication unit 110 configured to connect communication with a preset external server.

The preset external device may correspond to an external device to which a right capable of controlling the mobile terminal 100 is assigned by a user of the mobile terminal 100. For example, the preset external device may correspond to an external device separately configured to control the mobile terminal 100 in case that a user of the mobile terminal 100 lost the mobile terminal 100.

The preset external server may correspond to an external sever that a user account of the external server is owned by a user of the mobile terminal 100. In this case, the user of the mobile terminal 100 logs in the external server with the user account and may be able to remotely control the mobile terminal 100. In particular, the preset external server may correspond to an external server capable of remotely controlling the mobile terminal 100.

Referring to FIG. 15 (a), the controller 180 can control the second display 151-2 to display at least one letter inputted by a user on the second display 151-2. And, the controller 180 can recognize an initial letter of the at least one letter. When the lock screen is displayed, the controller 180 can control the main display 151-1 to display a letter image 620 corresponding to the recognized initial letter on the wallpaper image 630 of the lock screen. In this case, the letter image 620 may have a color corresponding to the wallpaper image.

Meanwhile, the controller 180 can change at least one selected from the group consisting of the letter image 620, the wallpaper image 630, and the color of the letter image 620 according to a preset event. In this case, the preset event includes a specific signal received from the preset external device or the preset external server.

Specifically, referring to FIG. 15 (b), if a specific signal is received from the preset external server or the preset external device, the controller 180 can control the main display 151-1 to display a preset letter image 650 instead of the letter image 620. In this case, the specific signal may correspond to a signal including a command for displaying the preset letter image 650. The preset letter image 650 may correspond to a letter image corresponding to letters inputted by a user in advance to display the preset letter image when the specific signal is received.

As an example, when a user lost a mobile terminal 100, if the user transmits a specific signal to the mobile terminal 100 using a preset external device, the controller 180 of the mobile terminal can control the main display 151-1 to display a letter image 650 corresponding to letters inputted by the user in advance when the specific signal is received.

As a different example, when a user lost the mobile terminal 100, the user accesses a preset external server and may be able to log in the external server using a user account of the user. And, the user can transmit a specific signal to the mobile terminal 100 using the external server. In this case, the controller 180 of the mobile terminal can control the main display 151-1 to display a letter image 650 corresponding to letters inputted by the user in advance when the specific signal is received.

Meanwhile, when the specific signal is received from the preset external server or the preset external device, the controller 180 can control the second display 151-2 to display letters inputted by the user in advance on the second display 151-2 as well.

According to the present embodiment, when a user lost the mobile terminal 100, a message for asking to send a notification to a contact preferred by the UE can be displayed on the mobile terminal 100.

Figure 16:
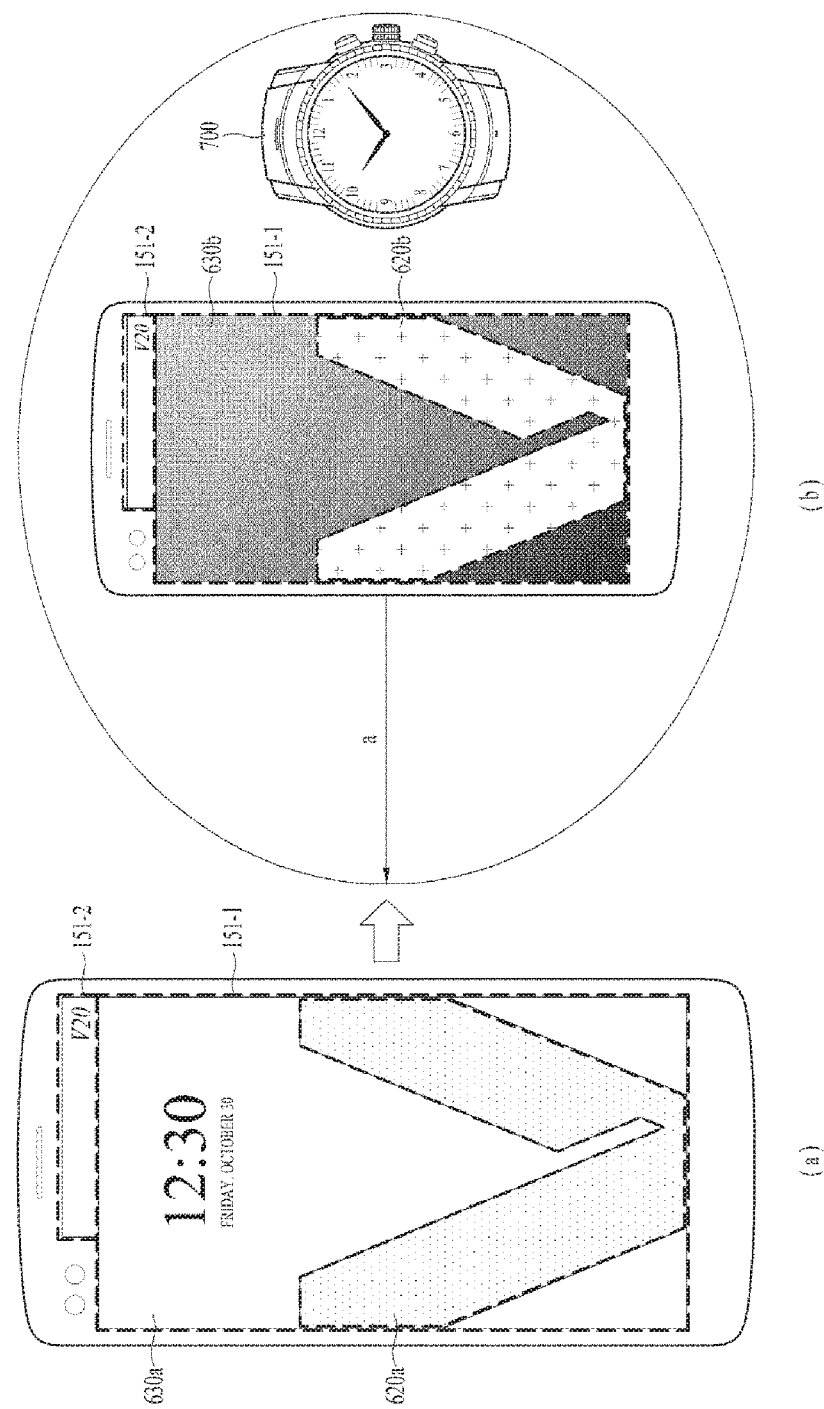
FIG. 16 is a diagram for explaining a further different example for a method of changing a lock screen image according to a preset event in a mobile terminal according to one embodiment of the present invention.

FIG. 16 is a diagram for explaining a further different example for a method of changing a lock screen image according to a preset event in a mobile terminal according to one embodiment of the present invention.

Referring to FIG. 16 (a), the controller 180 can control the second display 151-2 to display at least one letter inputted by a user on the second display 151-2. And, the controller 180 can recognize an initial letter of the at least one letter. When the lock screen is displayed, the controller 180 can control the main display 151-1 to display a letter image 620a corresponding to the recognized initial letter on the wallpaper image 630a of the lock screen. In this case, the letter image 620a may have a color corresponding to the wallpaper image.

Meanwhile, the mobile terminal 100 can include a wireless communication unit 110 configured to connect communication with a preset external device 700. In this case, the preset external device 700 may correspond to a wearable device capable of being worn on a body of the user as an external device configured by the user in advance in relation to the mobile terminal 100.

If the preset external device 700 is located within a predetermined distance (a) from the mobile terminal 100, the preset external device can perform communication with the mobile terminal 100.

Meanwhile, the controller 180 can change at least one selected from the group consisting of the letter image 620a, the wallpaper image 630a, and a color of the letter image 620a according to a preset event. In this case, the preset event includes communication connection established with the preset external device.

Specifically, referring to FIG. 16 (b), if the preset external device 700 is located within a predetermined distance (a) from the mobile terminal 100 and communication with the mobile terminal 100 is established, the controller 180 can change a color of the wallpaper image 630b with a first color set to the specific contact. And, the controller 180 can change a color of the letter image 620b with a second color corresponding to the changed first color. In this case, the first color may correspond to a color set to the preset external device. And, although the first color and the second color correspond to colors different from each other, the colors may correspond to colors of similar feeling, by which the present invention may be non-limited. The second color and the first color may correspond to complementary colors.

According to the present embodiment, a user is able to easily perceive whether or not an event occurs by checking a wallpaper image of a lock screen.

Method of Changing Lock Screen Image which is Displayed According to Whether or not Communication Connection is Established with Preset External Device According to one embodiment of the present invention, the controller 180 can display a different lock screen image according to whether or not communication connection is established with a preset external device. Regarding this, it shall be explained in more detail with reference to FIG. 17 in the following.

FIG. 17 is a diagram for explaining an example for a method of changing a lock screen image which is displayed according to whether or not communication connection is established with a preset external device in a mobile terminal according to one embodiment of the present invention.

According to the present invention, the mobile terminal 100 can include a wireless communication unit 110 configured to connect communication with a preset external device 700. In this case, the preset external device 700 may correspond to a wearable device capable of being worn on a body of the user as an external device configured by the user in advance in relation to the mobile terminal 100.

If the preset external device 700 is located within a predetermined distance (a) from the mobile terminal 100, the preset external device can perform communication with the mobile terminal 100.

Referring to FIG. 17 (a), the controller 180 can control the second display 151-2 to display at least one letter inputted by a user on the second display 151-2. And, the controller 180 can recognize an initial letter of the at least one letter. If the preset external device 700 is located within a predetermined distance (a) from the mobile terminal 100 and communication connection is established with the preset external device, the controller 180 can control the main display 151-1 to display a letter image 620 corresponding to the recognized initial letter on the wallpaper image 630 of the lock screen. In this case, the letter image 620 may have a color corresponding to the wallpaper image.

Referring to FIG. 17 (b), if the preset external device deviates from the predetermined distance (a) and a communication connection is not established with the preset external device, the controller 180 can control the main display 151-1 to display a preset letter image 650 on the wallpaper image 630 instead of the letter image 620 shown in FIG. 17 (a). The preset letter image 650 may correspond to a letter image corresponding to letters inputted by a user in advance to display the letters when the communication connection is not established with the preset external device.

When a user loses the mobile terminal 100, it is highly probable that the preset external device 700 and the mobile terminal 100 are apart from each other more than the predetermined distance (a). Hence, the preset letter image 650 may correspond to a letter image corresponding to letters configured to be displayed in case that the user loses the mobile terminal 100.

Meanwhile, according to an embodiment, the controller 180 can determine a letter image displayed on the lock screen using a distance between the preset external device 700 and the mobile terminal 100.

Specifically, if it is recognized as the preset external device 700 is located within a predetermined distance (a) from the mobile terminal 100, the controller 180 can control the main display 151-1 to display the letter image 620 corresponding to the initial letter.

Meanwhile, if it is recognized as the preset external device 700 is away from the mobile terminal 100 more than the predetermined distance (a), the controller 180 can control the main display 151-1 to display the preset letter image 650 instead of the letter image 620 corresponding to the initial letter.

In this case, a method of recognizing whether or not the preset external device 700 is located within the predetermined distance (a) from the mobile terminal 100 is described in the following.

As an example, the controller 180 can recognize a current location of the mobile terminal 100 using a location information module 115. And, a wireless communication unit 110 can receive current location information of the preset external device 700 from the preset external device 700. The controller 180 can recognize whether or not the preset external device 700 exists within the predetermined distance (a) from the mobile terminal 100 using the current location of the mobile terminal 100 and the received current location information of the preset external device.

As a different example, the controller 180 can recognize whether or not the preset external device 700 exists within the predetermined distance (a) from the mobile terminal 100 using a signal received from the preset external device 700 that the communication connection is established with the mobile terminal.

Specifically, the controller 180 can recognize whether or not the preset external device 700 exists within the predetermined distance (a) from the mobile terminal 100 using at least one of signal strength of the received signal and a signal loss rate of the received signal. The controller 180 can control the wireless communication unit 110 to transmit a first signal to the present external device 700 and receive a second signal in response to the first signal. In this case, the controller 180 calculates time at which the second signal is received after the first signal is transmitted to recognize whether or not the preset external device 700 exists within the predetermined distance (a) from the mobile terminal 100.

The method for the mobile terminal to recognize whether or not the preset external device exists within the predetermined distance is not restricted by the aforementioned example. It may be able to recognize whether or not the preset external device exists within the predetermined distance using an infrared sensor, a radar sensor, or the like included in the sensing unit 140.

Method of Changing Lock Screen Image According to Meaning of Word Inputted by User According to the present invention, the controller 180 recognizes a meaning of a word constructed by at least one letter inputted by a user and may be able to change a lock screen image according to the recognized meaning. Regarding this, it shall be explained in more detail with reference to FIG. 18 in the following.

Figure 18:
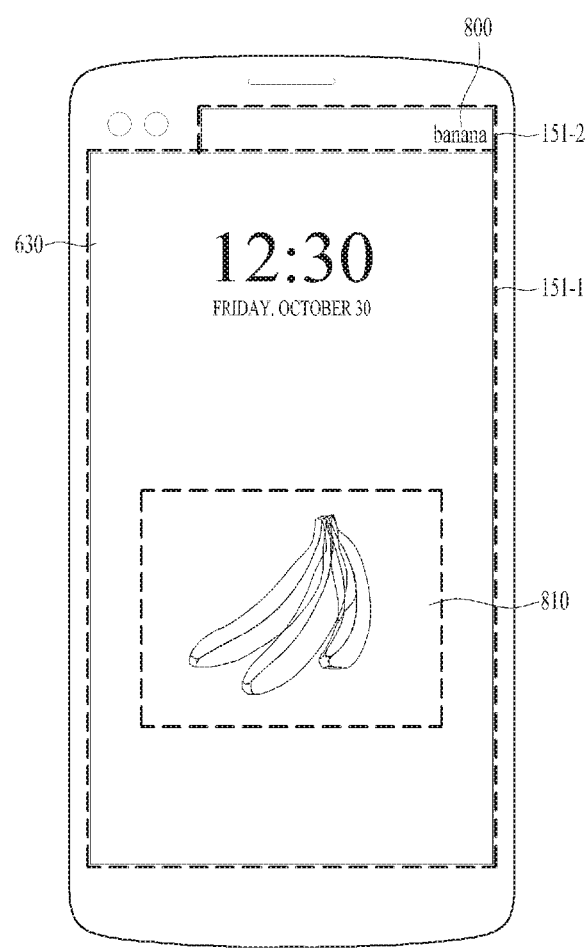
FIG. 18 is a diagram for explaining an example for a method of changing a lock screen image according to a meaning of a word inputted by a user in a mobile terminal according to one embodiment of the present invention.

FIG. 18 is a diagram for explaining an example for a method of changing a lock screen image according to a meaning of a word inputted by a user in a mobile terminal according to one embodiment of the present invention.

According to the present invention, when a lock screen is displayed, the controller 180 controls the second display 151-2 to display at least one letter inputted by a user on the second display 151-2.

For example, referring to FIG. 18, if a user inputs 'banana' as the at least one letter, the controller 180 can control the second display 151-2 to display the at least one letter 'banana' on the second display 151-2.

Meanwhile, the controller 180 can recognize at least one word using the at least one letter. Specifically, when the at least one letter is inputted, the controller 180 can recognize whether or not the at least one letter configures a word. For example, if a user inputs a plurality of letters 'banana', the controller 180 recognizes it as 'banana' configures such a word as a banana.

Meanwhile, if it is recognized as the at least one letter configures at least one word, the controller 180 can recognize a meaning of the at least one word. An algorithm for extracting the meaning of the at least one word can be stored in the memory 170 in advance. The controller 180 can recognize at least one word configured by the at least one letter.

If the controller 180 recognizes the meaning of the at least one word, the controller can control the main display 151-1 to display a specific image corresponding to the meaning of the at least one word on a wallpaper image 630 of a lock screen.

In particular, if the meaning of the at least one word is recognized, as shown in FIG. 8, the controller 180 can display the specific image on the wallpaper image 630 of the lock screen instead of displaying an image corresponding to an initial letter of the at least one word on the wallpaper image 630 of the lock screen.

In this case, a method of extracting the specific image corresponding to the meaning of the at least one word is described in the following.

As an example, the controller 180 can recognize at least one word using the at least one letter. The controller 180 can recognize a meaning of the at least one word. If the meaning of the at least one word is recognized, the controller 180 may search for an image corresponding to the recognized meaning on the Internet. And, if one image is searched on the Internet, the controller 180 can control the main display 151-1 to display the searched image on the wallpaper image 630 of the lock screen as the specific image.

As a different example, the controller 180 can recognize at least one word using the at least one letter. The controller 180 can recognize a meaning of the at least one word. If the meaning of the at least one word is recognized, the controller 180 may search for an image corresponding to the recognized meaning on the Internet. And, if a plurality of images are searched on the Internet, the controller 180 can control the main display 151-1 to display each of a plurality of the images on the wallpaper image 630 of the lock screen for preset time.

As a further different example, the controller 180 can recognize at least one word using the at least one letter. The controller 180 can recognize a meaning of the at least one word. If the meaning of the at least one word is recognized, the controller 180 may search for an image corresponding to the recognized meaning on the Internet. And, if a plurality of images are searched on the Internet, the controller 180 can control the main display 151-1 to display an image satisfying a predetermined condition (e.g., an image of greatest hits) on the wallpaper image 630 of the lock screen.

According to the present embodiment, since an image displayed on a lock screen is determined based on at least one letter inputted by a user, an image preferred by the user can be automatically displayed on the lock screen.

Method of Displaying at Least One Letter Inputted by User on Home Screen

According to one embodiment of the present invention, the controller 180 can display at least one letter inputted by a user on a home screen. Regarding this, it shall be explained in more detail with reference to FIG. 19 in the following.

Figure 19:
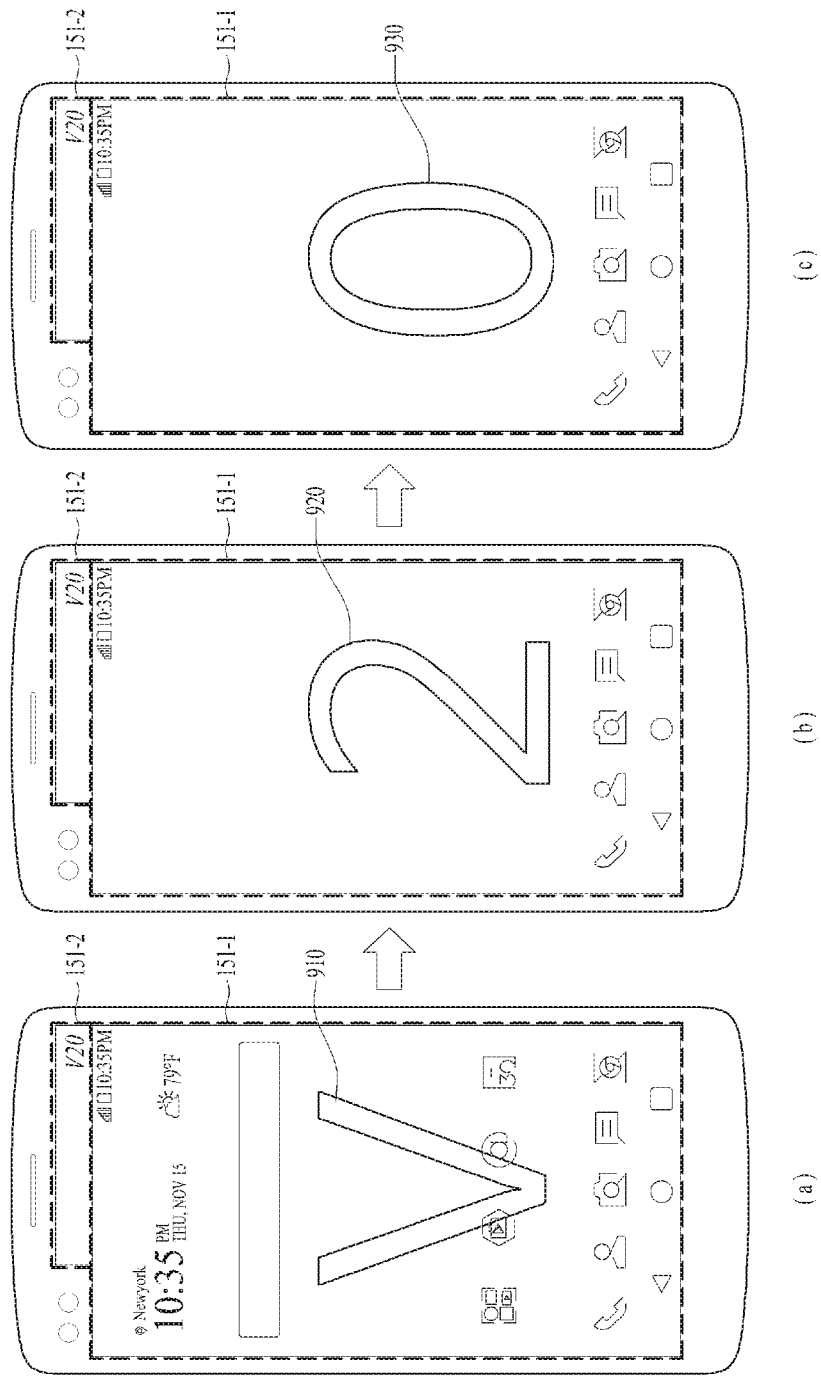
FIG. 19 is a diagram for explaining an example for a method of displaying at least one letter inputted by a user on a home screen in a mobile terminal according to one embodiment of the present invention.

FIG. 19 is a diagram for explaining an example for a method of displaying at least one letter inputted by a user on a home screen in a mobile terminal according to one embodiment of the present invention.

According to the present invention, when a lock screen is displayed, the controller 180 can control the second display 151-2 to display at least one letter inputted by a user on the second display 151-2.

Meanwhile, according to one embodiment of the present invention, when a home screen is displayed, the controller 180 can control the main display 151-1 to display a letter image 910/920/930 corresponding to a specific letter among the at least one letter on a wallpaper image of the home screen.

The controller 180 can control the main display 151-1 to display a letter image 910 corresponding to an initial letter of the at least one letter on a wallpaper image of a first home screen. In this case, the first home screen corresponds to a firstly displayed screen when the home screen is displayed.

For example, referring to FIG. 19 (a), if the at least one letter corresponds to 'v20', the controller 180 can recognize 'v' as the initial letter. The controller 180 can control the main display 151-1 to display a letter image 910 corresponding to the initial letter 'v' on the first home screen.

The controller 180 can control the main display 151-1 to display a letter image 910 corresponding to a second letter of the at least one letter on a wallpaper image of a second home screen. In this case, the second home screen may correspond to a screen displayed right after the first home screen. In particular, the second home screen may correspond to a screen displayed on a screen which is changed according to an input of a user in a state that the first home screen is displayed.

For example, referring to FIG. 19 (b), if the at least one letter corresponds to 'v20', the controller 180 can recognize the second letter '2'. The controller 180 can control the main display 151-1 to display a letter image 910 corresponding to the second letter '2' on the second home screen.

The controller 180 can control the main display 151-1 to display a letter image 910 corresponding to a third letter of the at least one letter on a wallpaper image of a third home screen. In this case, the third home screen may correspond to a screen displayed right after the second home screen. In particular, the third home screen may correspond to a screen displayed on a screen which is changed according to an input of a user in a state that the second home screen is displayed.

For example, referring to FIG. 19 (c), if the at least one letter corresponds to 'v20', the controller 180 can recognize the third letter 'O'. The controller 180 can control the main display 151-1 to display a letter image 910 corresponding to the third letter 'O' on the third home screen.

Consequently, the controller 180 can determine a letter image corresponding to one letter among the at least one letter to be displayed according to a currently displayed home screen.

However, the number of the at least one letter may not be matched with the number of home screens. In this case, the controller 180 can appropriately divide the number of the at least one letter in accordance with the number of the home screens. And, the controller 180 can control the main display 151-1 to display the divided letters on a home screen in accordance with the divided order.

Method of Displaying Icon or Screen Related to Currently Executed Application

According to one embodiment of the present invention, an icon or a screen related to a currently executed application can be displayed on a lock screen. Regarding this, it shall be explained with reference to FIG. 20 in the following.

Figure 20:
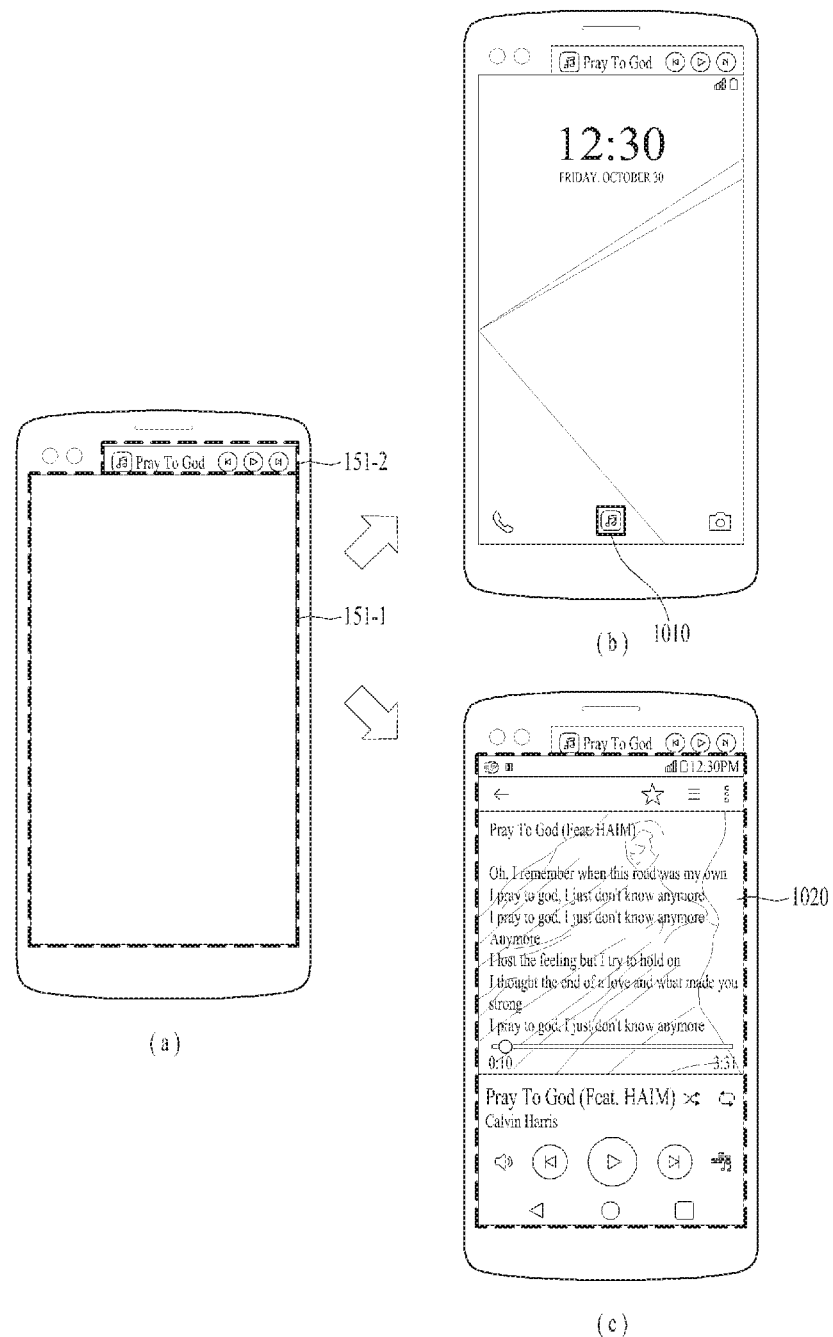
FIG. 20 is a diagram for explaining an example for a method of displaying an icon or a screen related to a currently executed application on a lock screen in a mobile terminal according to one embodiment of the present invention.

FIG. 20 is a diagram for explaining an example for a method of displaying an icon or a screen related to a currently executed application on a lock screen in a mobile terminal according to one embodiment of the present invention.

Referring to FIG. 20 (a), the controller 180 can control the second display 151-2 to display a reduced execution screen related to a currently executed application on the second display 151-2. In this case, power of the main display 151-1 may be turned off or the power of the main display 151-1 may be turned on.

For example, if a currently executed application corresponds to a music playing application, the controller 180 can control the second display 151-2 to display a reduced execution screen related to the music playing application on the second display 151-2.

Meanwhile, referring to FIG. 20 (b), when a lock screen is displayed, the controller 180 can control the main display 151-1 to display an icon 1010 related to the currently executed application on an area of the lock screen.

For example, if a currently executed application corresponds to a music playing application, the controller 180 can control the main display 151-1 to display an icon 1010 related to the music playing application on an area of the lock screen.

Meanwhile, if the icon 1010 displayed on the lock screen is selected, the controller 180 can control the main display 151-1 to immediately display an execution screen of the currently executed application.

Meanwhile, referring to FIG. 20 (c), when the lock screen is displayed, the controller 180 can control the main display 151-1 to display a screen 1020 related to the currently executed application on an area of the lock screen. In this case, the screen 1020 related to the currently executed application may correspond to an execution screen of the currently executed application.

For example, if the currently executed application corresponds to a music playing application, the controller 180 can control the main display 151-1 to display an execution screen of the music playing application on the lock screen.

According to the present embodiment, it may be able to more easily enter the currently executed application.

According to at least one of the embodiments of the present invention, since a wallpaper image displayed on a lock screen is automatically changed based on a phrase inputted by a user, it may be able to provide convenience to the user. And, since an image displayed on the lock screen is changed according to occurrence of a preset event, it may be able to enable a user to easily recognize the occurrence of the event.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a wireless communication unit configured to communicate with a preset external device;
    a memory configured to store at least one letter inputted by a user;
    a first display;
    a second display configured to display the at least one letter; and
    a controller configured to:
    control the first display to display a wallpaper image of a lock screen;
    control the first display to display a letter image corresponding to an initial letter of the at least one letter on the wallpaper image;
    control the first display to display the letter image on the wallpaper image in response to the communication with the preset external device; and
    when the preset external device is not communicated with the mobile terminal, control the first display to display a preset letter image instead of the letter image on the wallpaper image.

2. The mobile terminal of claim 1, wherein color of the letter image corresponds to the wallpaper image.

3. The mobile terminal of claim 2, wherein the controller is further configured to change at least one of the letter image, the wallpaper image or the color of the letter image in response to a preset event.

4. The mobile terminal of claim 3, wherein the preset event includes a call reception or a message reception from a specific contact.

5. The mobile terminal of claim 3,
wherein the preset event includes a specific signal reception from the preset external device or the communication with the preset external device.

6. The mobile terminal of claim 2, wherein the controller is further configured to change at least one of the wallpaper image or the color of the letter image in response to a specific input.

7. The mobile terminal of claim 6, wherein the controller is further configured to change theme of the mobile terminal in response to a change of the wallpaper image by the user.

8. The mobile terminal of claim 1, wherein the controller is further configured to:
detect at least one word by using the at least one letter, and
control the first display to display a specific image instead of the letter image on the wallpaper image in response to detecting a meaning of the at least one word,
wherein the specific image corresponds to the meaning of the at least one word.

\* \* \* \* \*